United States Patent

[11] 3,608,807

| [72] | Inventor | Conrad E. Lee<br>Mound, Minn. |
|---|---|---|
| [21] | Appl. No. | 44,792 |
| [22] | Filed | June 9, 1970 |
| [45] | Patented | Sept. 28, 1971 |
| [73] | Assignee | Pako Corporation<br>Minneapolis, Minn. |

[54] DRIVING MECHANISM FOR A ROLLER TRANSPORTING DEVICE
9 Claims, 3 Drawing Figs.

[52] U.S. Cl. .................................................. 226/188,
226/189, 74/68
[51] Int. Cl. .................................................. B65h 17/20
[50] Field of Search ...................................... 226/188,
189; 74/68

[56] References Cited
UNITED STATES PATENTS

| 438,239 | 10/1890 | Laffitte .................... | 74/68 |
| 3,078,024 | 2/1963 | Sardeson .................. | 226/189 X |
| 3,433,083 | 3/1969 | Pope et al. ................ | 74/68 |

FOREIGN PATENTS

| 905,802 | 9/1962 | Great Britain |

*Primary Examiner*—Allen N. Knowles
*Attorney*—Wicks and Nemer

ABSTRACT: Driving means for transporting sheet material between a series of companion rollers rotatable in opposite directions and which are rotatably mounted in bearing means and rotated by cranks acting between said rollers and driving plates being each actuated by one driven crank acting between the plate and rotatably supported on parallel shafts journaled in said bearing means, and two or more floating cranks, one of said shafts being driven by motive means and the other by meshing spur gears mounted on said shafts.

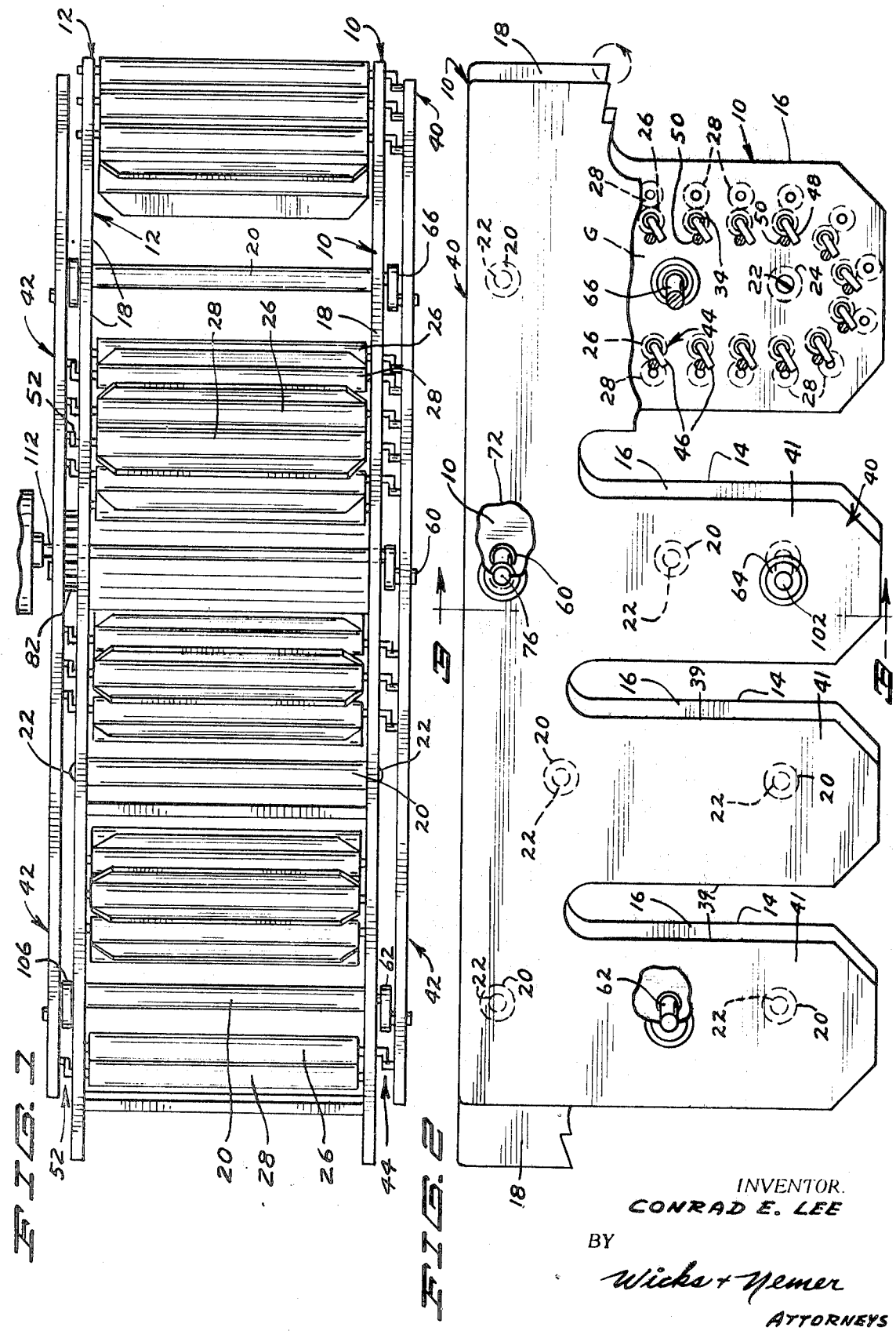

INVENTOR.
CONRAD E. LEE

DRIVING MECHANISM FOR A ROLLER TRANSPORTING DEVICE

RELATED APPLICATIONS

This application is a companion case related to the application for patent of Edward Savela, for Driving Device for a Series of Rollers, filed Feb. 7, 1968, Ser. No. 703,576, now U.S. Pat. No. 3,520,461 copending herewith.

SUMMARY OF THE INVENTION

In applicant's related application several driven cranks were used to drive each driving plate while in the instant invention only one driven crank for each plate is required thereby substantially simplifying the transmission and using a single pair of spur gears instead of a number of bevel gears or the like.

In the drawings forming part of this application:

FIG. 1 is a plan view of a roller transporting device illustrating an embodiment of the invention.

FIG. 2 is a side elevational view of the bearing plate and drive plate shown in FIG. 1 with parts thereof being broken away.

Figure 3:
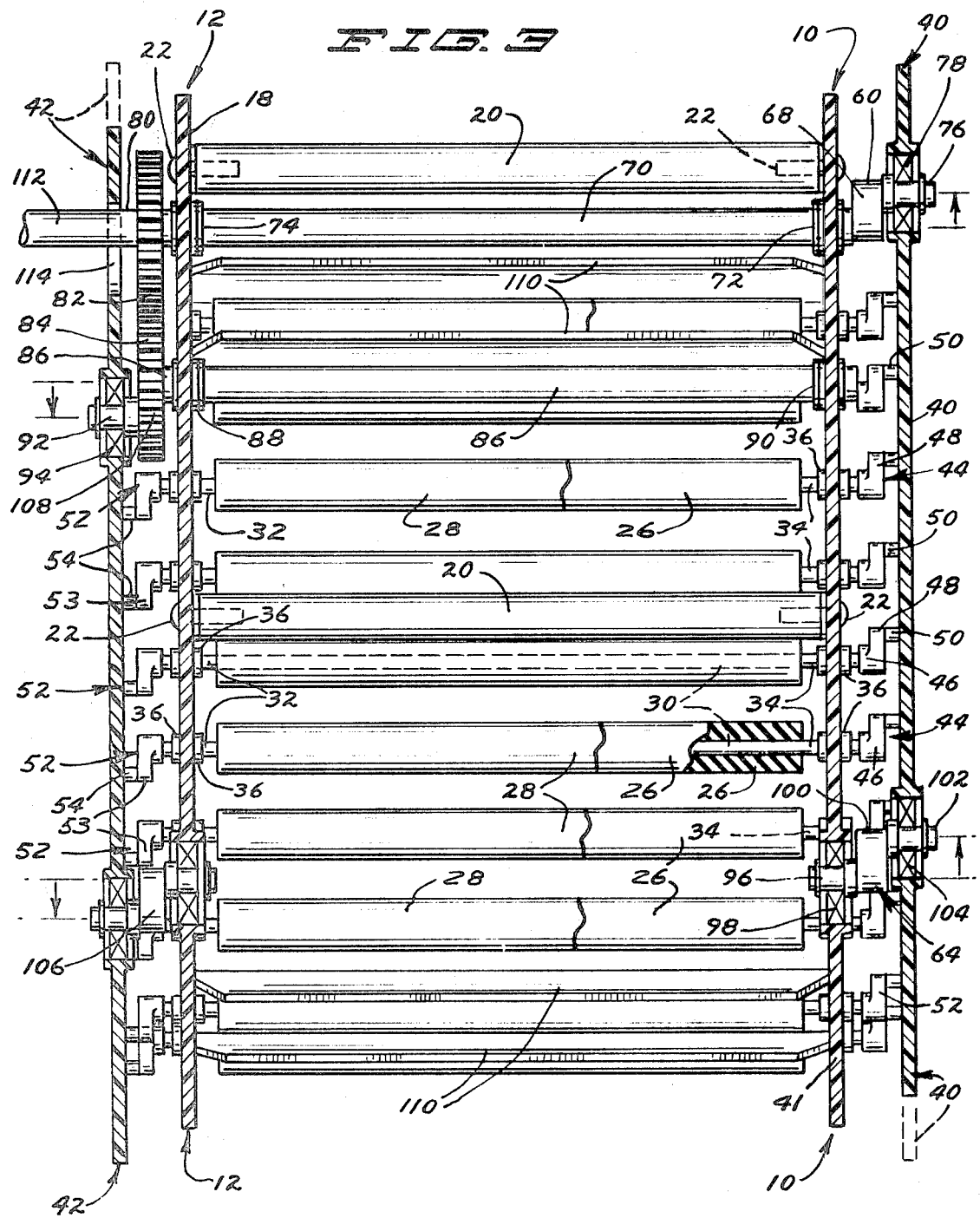
FIG. 3 is a sectional elevational view taken on the line 3—3 of FIG. 2 through the entire device, portions of which are broken away, and drawn to a greater scale with the cranks rotated.

The transporting device shown is similar to that illustrated in the companion application for patent and is used for transporting photographic film into successive tanks (not shown) for developing the same.

The device illustrated comprises two spaced stationary bearing plates 10 and 12 each of which is formed with slots 14 to provide depending sections 16 connected to continuous top sections 18. These plates are connected together by means of elongated tubular spacers 20 which have screwed into the ends thereof screws 22 which pass through said plates and tie the parts together.

Following along the sections 18 and 16 are pairs of rollers 26 and 28 each of which has spindles 30 extending throughout the length of the same and beyond the ends of the rollers. The ends 32 and 34 of these spindles are journaled in bearings 36 formed on the bearing plates 10 and 12.

The rollers 28 as viewed in FIG. 2 travel in a clockwise direction while the rollers 26 travel in a counterclockwise direction. These pairs of rollers have a proximity which cause transporting of sheet material therebetween.

Opposite and outwardly of the bearing plate 10 is a driving plate 40, and opposite and outwardly of the bearing 12 is a driving plate 42, each driving plate formed with slots 39 to provide depending sections 41. The rollers 26 have mounted on the same cranks 44 which are disposed between bearing plate 10 and drive plate 40 and which comprise bases 46 attached to the ends 34 of the spindles 30. Issuing outwardly from the bases 46 are crank arms 48 which are engaged by crank pins 50 extending outwardly from and made fast on the plate 40, there being one crank pin for each of the cranks 44 of rollers 26. The ends 34 of spindles 30 of rollers 28 and between bearing plate 10 and driving plate 40 have no cranks attached to them.

In a similar manner the ends 32 of spindles 30 of rollers 28 have attached to them the cranks 52 identical with cranks 44 and which are disposed in the space between bearing plate 12 and driving plate 42. These cranks have crank arms 53 which are engaged by crank pins 54 on the driving plate 42. The cranks 44 are driven by crank pins 50 thereby driving rollers 26. The cranks 52 are driven by crank pins 54 thereby driving rollers 28. The ends 32 of spindles 30 of rollers 26 and between bearing plate 12 and driving plate 42 have no cranks attached to them.

The driving plate 40 is supported and driven by means of a driven crank 60 and three floating cranks 62, 64 and 66. The driven crank 60, FIG. 3 in particular, comprises a crank arm 68 which is secured to a shaft 70 journaled in bearings 72 and 74 carried by bearing plates 10 and 12, respectively. This crank 60 has a crank pin 76 which is journaled in a ball bearing 78 carried by the driving plate 40. The other end 80 of shaft 70 has attached to it a spur gear 82 which meshes with another spur gear 84 of the same diameter as the gear 82 and mounted on another shaft 86. The shaft 86 is journaled in other bearings 88 and 90 carried by the bearing plates 12 and 10. The gear 84 serves as a crank arm and has issuing from it a crank pin 92 which is journaled in a ball bearing 94 in the drive plate 42 thus forming a driven crank indicated by the reference numeral 108 which drives the driving plate 42. This crank has the same throw as crank 60 serves the same purpose in connection with the driving plate 42.

The floating crank 64 is best shown in FIG. 3 and comprises a crank shaft 96 which is journaled in a ball bearing 98 carried by the bearing plate 10. Issuing outwardly from shaft 96 is a crank arm 100 and which carries a crank pin 102. This crank pin is journaled in a ball bearing 104 carries by the driving plate 40. The floating cranks 62 and 66 are constructed in the same manner as the crank 64 and have the same throw.

On the opposite side of the transporting device relative to plate 10 and driving plate 42 a corresponding number of floating cranks is employed one of which is indicated by the reference number 106. The construction of this crank is identical with that of crank 64 and is mounted in a similar manner and assists the crank 108 in giving driving plate 42 the desired movement. The movement of the plates is a rectilinear and rotary movement.

To guide the sheet material transported where the same passes around curves, guides 110 are employed and which are disposed between the rollers 30 and secured to the bearing plates 10 and 12.

The mechanism is driven by means of the shaft 70, one end 112 of which extends through an opening 114 in driving plate 42 and is connected to a speed reduction driven by an electric motor. Such construction being well known in the art which has not been shown.

When the mechanism is to be used with a photographic film developer suitable tanks for chemicals are provided and into which the sections 16 with attached parts are inserted the same as shown in copending application Ser. No. 703,576.

The operation of the invention is as follows: When the lines passing through the axes of the crank pin and crank shaft of the driven crank and a floating crank are in alignment, movement of the driven crank will not cause the desired movement of the driving plate in the desired manner. However, when these lines are out of alignment, the desired movement is obtained, hence the various floating cranks are arranged so that when the denoted lined between the driven crank and any one of the floating cranks are in alignment, the denoted lines between the driven crank and at least one of the floating crank are out of alignment.

The advantages of the invention are manifest. A great reduction in the number of parts results. With the construction shown only one driven crank for each driving plate is required. Inexpensive spur gears between the two driven cranks are used thereby reducing the number of gears and at the same time procuring reversal of the movement of the driving plates.

What is claimed is:

1. In a processing means comprising a plurality of rotary members, bearing means for supporting said rotary members for rotation, driving means, individual cranks acting between said driving means and said rotary members, the combination of operating means for operating said driving means and comprising:

a. a single driven crank acting between said bearing means and said driving means,
   b. a first floating crack acting between said bearing means and said driving means,
   c. a second floating crank acting between said bearing means and said driving means,
   d. the radial lines passing through the axes of the crank shaft and crank pin of the driven crank and of the first floating crank being out of alignment when the radial lines passing through the axes of the crank shaft and crank pin of the driven crank and of the second floating crank are in alignment, and e. all of said cranks having the same throw and, f. motive means for driving said driven crank.

2. Operating means for operating said driven means according to claim 1 in which:

a. a line extending through the crank shaft axis of the driven crank and the crank shaft axis of one of the floating cranks forms with a similar line extending through the crank shaft axis of the driven crank and the crankshaft axis of the other floating crank make an angle of greater than 45 degrees.

3. Operating means for operating said driven means according to claim 1 in which:

a. a single driven crank is employed and b. more than two floating cranks are employed.

4. Operating means for operating said driven means according to claim 1 in which:

a. the bearing means is in the form of a plate, b. the driven means is in the form of a plate, and c. the crank shafts of said floating cranks terminate substantially at the surface of said bearing plate adjacent said rotary members.

5. In progressing means for progressing sheet material comprising pairs of companion rollers rotating in opposite directions and between which the sheet material travels, first bearing means for one end of each of said rollers and second bearing means for the other ends of said rollers, first and second driving means adjacent said bearing means, cranks acting between said first driving means and the rollers traveling in one direction and the other cranks acting between said second driving means and the rollers traveling in the opposite direction, the combination of:

a. a first shaft having its axis fixed and parallel to the axes of said rollers, b. a first driven crank on said shaft having its crank pin engaging said first driving means, c. means cooperating with said first driven crank to cause every point in said first driving means to travel in a circle having the same diameter as the throw of said first named crank, d. a second driven shaft having its axes fixed and parallel with the first driven shaft and the axes of said rollers, e. a second driven crank on said second driven shaft having its crank pin engaging said second driving means, f. means cooperating with said second driven crank to cause every point in said second driving means to travel in a circle having the same diameter as the throw of said second named driven crank and g. meshing spur gears on said shafts causing said first and second shafts to rotate in opposite directions.

6. In a progressing means comprising a plurality of rotary members, first and second bearing plates supporting said rotary members for rotation, first and second driving plates each adjacent a first and second bearing plate respectively individual cranks acting between said driving plates and said rotary members, the combination of operating means for operating said driving plates and comprising:

a. a first driven crank acting between said first bearing plate and said first driving plate, b. a second driven crank acting between said second bearing plate and said second driving plate, c. first floating crank means acting between said first bearing plate and said first driving plate d. second floating crank means acting between said first bearing plate and said first driving plate, e. first floating crank means acting between said second bearing plate and said second driving plate, f. second floating crank means acting between said second bearing plate and said second driving plate, and g. motive means for driving said driven cranks.

7. The device of claim 6 in which:

a. the radial lines passing through the axes of the crank shafts and crank pins of the driven cranks and the first floating cranks acting with each therewith being out of alignment when the radial lines passing through the axes of the crank shafts and crank pins of the driven cranks and the second floating cranks acting with each therewith are in alignment, b. all of said cranks having the same throw.

8. In a device for progressing sheet material between pairs of rollers, a pair of driving plates, a pair of bearing plates rotatably mounting said rollers, cranks on said rollers, pins on said driving plates for engagement with said cranks on said rollers, and means for driving said driving plates in a rotary and rectilinear movement to cause said pins on said driving plates to rotate said rollers through said cranks, the improvement in said means for driving said driving plates, said improvement including a. a shaft rotatably mounted on said pair of bearing plates, b. a first crank mounted on said shaft and rotatably connected with a first of said driving plates, c. a second crank rotatably mounted on the second of said bearing plates and rotatably connected with the second of said driving plates, d. means on said shaft for rotating said second crank, e. floating crank means carried by each of said driving plates and a bearing plate whereby upon a rotation of said shaft said driving plates are moved in a rotary and rectilinear movement to cause said pins on said driving plates to operate said crank on said rollers to rotate the same.

9. The device of claim 7 in which said means on said shaft for rotating said second crank includes a. a gear mounted on said shaft in engagement with a b. gear formed on said second crank.